United States Patent [19]
Sato et al.

[11] Patent Number: 5,408,324
[45] Date of Patent: Apr. 18, 1995

[54] DISTANCE MEASURING METHOD AND APPARATUS THAT COMPARES SIGNALS FROM PLURAL PHOTOCELLS

[75] Inventors: Kosuke Sato, Osaka; Takayuki Yoshigahara, Tokyo, both of Japan

[73] Assignee: Sony Corporation, Japan

[21] Appl. No.: 34,403

[22] Filed: Mar. 19, 1993

[30] Foreign Application Priority Data

Mar. 19, 1992 [JP] Japan .................................. 4-093806

[51] Int. Cl.⁶ .............................................. G01B 11/24
[52] U.S. Cl. ...................................... 356/376; 250/560
[58] Field of Search ............... 356/376, 377, 375, 380; 250/560

[56] References Cited

U.S. PATENT DOCUMENTS

| | | | |
|---|---|---|---|
| 4,794,262 | 12/1988 | Sato et al. | 356/376 |
| 4,991,968 | 2/1991 | Yonescu et al. | 356/376 |
| 4,993,835 | 2/1991 | Inoue et al. | 356/376 |
| 5,107,103 | 4/1992 | Gruss et al. | 250/208.3 |

FOREIGN PATENT DOCUMENTS

| | | |
|---|---|---|
| 0462595 | 12/1991 | European Pat. Off. |
| 62-228106 | 10/1987 | Japan |

OTHER PUBLICATIONS

Applied Optics vol. 32, No. 13, 1 May 1993, New York US pp. 2323–2330 XP362799 Kramer et al "Inexpensive Range Camera Operating at Video Speed".

IEEE Journal of Solid-State Circuits vol. 26, No. 3, 1 Mar. 1991, New York US pp. 184–190 XP222594 Gruss et al "Integrated Sensor and Range-Finding Analog Signal Processor".

*Primary Examiner*—Robert P. Limanek
*Assistant Examiner*—David B. Hardy
*Attorney, Agent, or Firm*—Ronald P. Kananen

[57] ABSTRACT

A distance measuring method and apparatus accurately detects point in time when reflected slit light passes a cell constituting an imaging plane. Each of the cells constituting the imaging plane includes a pair of photo-sensors disposed side by side along the direction of movement of the reflected slit light. A comparator compares photoelectric currents outputted from the pair of photo-sensors, and a point in time at which the reflected slit light moves from a first one to a second one of the photo-sensors of the cell is determined based on the output of the comparator. The point in time thus detected is determined as a point in time at which the reflected slit light passes the cell and is used for measurement of the distance to the subject for measurement.

6 Claims, 11 Drawing Sheets

φ1

φ2

φ3

FIG. 8
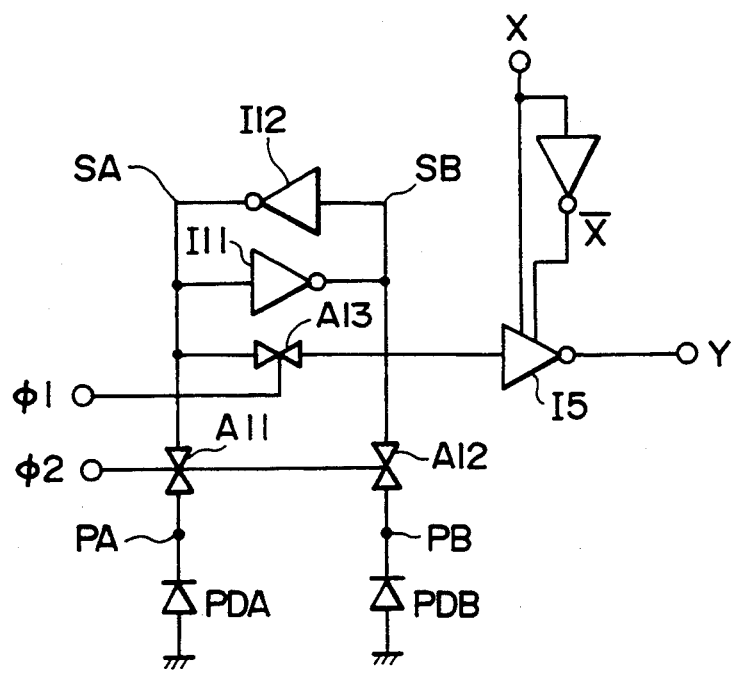
FIG. 9(a) φ1
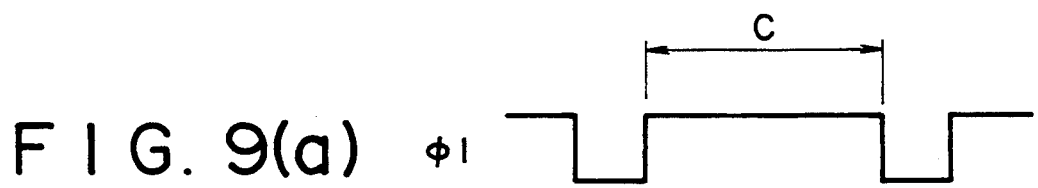
FIG. 9(b) φ2
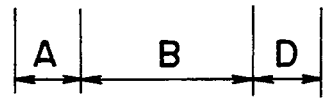

F I G. 10
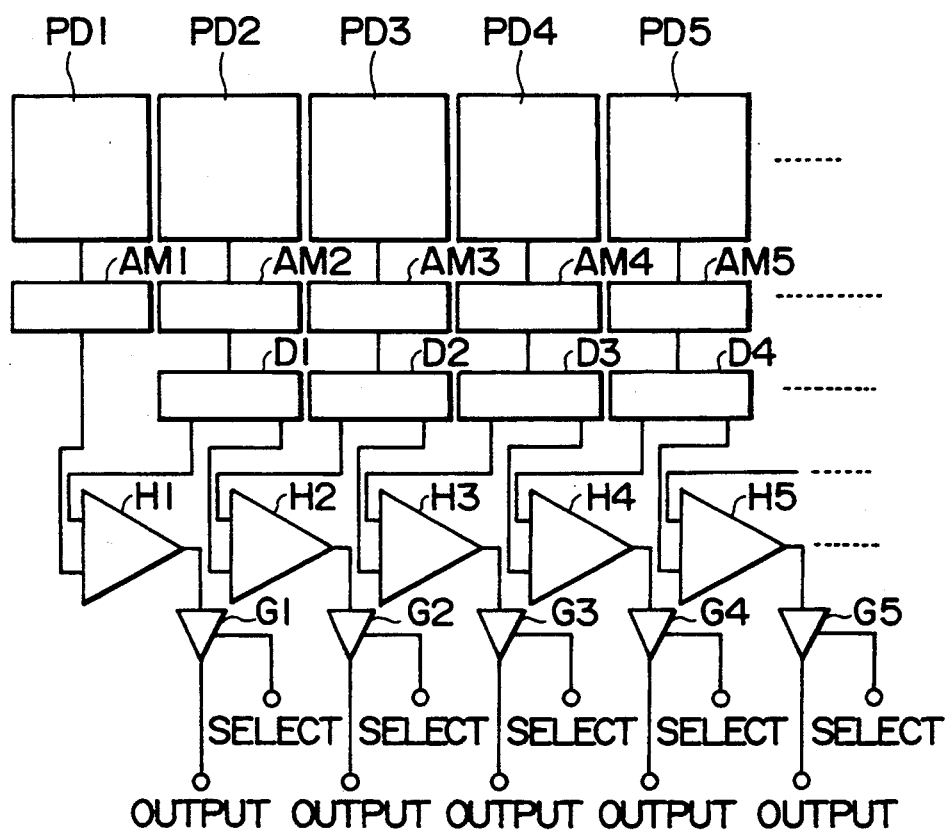

FIG. 12(a) φ1
FIG. 12(b) φ2
FIG. 12(c) φ3
FIG. 12(d) ZO
FIG. 12(e) $\overline{ZO}$
FIG. 12(f) OUTPUT OF AND 1
FIG. 12(g) OUTPUT OF AND 2

DISTANCE MEASURING METHOD AND APPARATUS THAT COMPARES SIGNALS FROM PLURAL PHOTOCELLS

BACKGROUND OF THE INVENTION

1. Field of the Invention

This invention relates to a distance measuring method and apparatus suitable for use for measurement of a shape of a three-dimensional object.

2. Description of the Related Art

In distance measurement based on an optical cutting method which makes use of slit light, a three-dimensional position of a subject for measurement can be determined based on triangulation using, as shown in FIG. 13, a direction of projection of slit light from a light source, a sight line direction of a camera including a lens and an imaging plane and a positional relationship between the light source and the camera.

Recently, much effort is directed to investigations for scanning of slit light with a rotary mirror to effect such distance measurement as described above at a high speed, and various methods have been proposed. In a most popular one of the methods, a plurality of cells are disposed in a matrix to form an imaging plane, and a point in time at which slit light passes a point (small area) of a subject for measurement which is being measured by each cell, that is, a point in time when the slit light reflected from the subject for measurement passes each cell, is detected. Then, based on the points in time thus detected, an angular position of a mirror by which the slit light is being scanned is determined to make a distance measurement. The method is disclosed in detail, for example, in Japanese Patent Laid-Open Application No. Showa 62-228106.

In the conventional distance measuring method described above, one photo-sensor, such as, for example, a photodiode or a phototransistor, is disposed for each of the cells of the imaging plane, and a threshold level is set for photoelectric currents outputted by photo-sensors to detect passage of the slit light. Accordingly, the conventional distance measuring method is disadvantageous in the following points:

Firstly, the amount of slit light reflected from the subject for measurement and projected to the imaging plane and the spatial extent of the slit light in its widthwise direction, refer to FIG. 14, depend upon a condition, a direction and so forth of a surface of the subject for measurement. As shown in FIG. 15, when the amount of light is small, the photoelectric current of a photo-sensor may not exceed the threshold level, and consequently, the slit light cannot be detected. On the other hand, when the amount of the slit light differs, the variation in photoelectric current flowing through a cell with respect to time also differs, and some displacement is produced at a point of time when the slit light is detected with the fixed threshold level, resulting in an error in distance measurement.

Secondly, when the temperature of a photo-sensor on the imaging plane rises as a result of measurement for a long time or by some other cause, dark current varies, and consequently, passage of the slit light cannot be detected accurately. Accordingly, temperature compensation is required.

Thirdly, if received light is integrated and a resultant integration value is read out, then the sensitivity is improved so that it becomes possible to measure the distance to an object at a long distance or an object having a comparatively low reflection factor. In this instance, however, when bias light, which is light from any subject for measurement in a common environment in which the slit light is not received, from a point being measured by a certain cell is different from bias light from another point being measured by another cell positioned at a different location on the same imaging plane, the threshold level must be adjusted for each of the cells. However, it is difficult to adjust the threshold level for each cell. Accordingly, it cannot be avoided to employ such a countermeasure as to adjust the environment so that no difference in bias light may be produced between different measurement points or to make reflected light of the slit light extremely higher than bias light. This makes an obstacle to a measurement of common environment. This is the reason why a differentiation method which is low in sensitivity is adopted widely.

SUMMARY OF THE INVENTION

It is an object of the present invention to provide a distance measurement method and apparatus wherein a point in time at which reflected slit light passes a cell can be detected accurately.

It is another object of the present invention to provide a distance measurement method and apparatus wherein a point in time at which reflected slit light passes a point constituting an imaging plane can be detected accurately while maintaining a high resolution along a direction of movement of the reflected slit light.

In order to attain the objects described above, according to an aspect of the present invention, there is provided a distance measuring method, which comprises the steps of scanning slit light in a direction along a surface of a subject for measurement, receiving the slit light reflected from the subject for measurement on an imaging plane constituted from a plurality of cells each including a pair of photo-sensors disposed side by side along the direction of movement of the reflected slit light, comparing magnitudes of photoelectric currents outputted from the photo-sensors of each of the cells with each other, determining, based on a result of the comparison, a point in time at which the reflected slit light moves from one to the other of the photo-sensors of each of the cells and determining the point in time as a point in time at which the reflected slit light passes the cell, and detecting the position of the surface of the subject for measurement from the thus determined points in time at which the reflected slit light passes the cells of the imaging plane.

According to another aspect of the present invention, there is provided a distance measuring apparatus, which comprises means for emitting slit light to a subject for measurement and scanning the slit light in a lateral direction along a surface of the subject for measurement, means for receiving the slit light reflected from the subject for measurement on an imaging plane, the receiving means including a plurality of cells which define the imaging plane, each of the cells including a pair of photo-sensors disposed side by side along the direction of movement of the reflected slit light and a comparator for comparing magnitudes of photoelectric currents outputted from the photo-sensors, means for detecting a point in time at which an output of the comparator of each of the cells exhibits a reversal of the relationship in magnitude between the output photoelectric currents of the photo-sensors of the cell, a memory for storing therein the point in time detected for each of the cells by the detecting means as a point in time at which the reflected slit light passes the cell, and means for measuring the position of the surface of the subject for measurement based on the points in time stored in the memory.

In the distance measuring method and apparatus, magnitudes of photoelectric currents outputted from the two photo-sensors of each of the cells are compared with each other, and a point in time at which the reflected slit light moves from one to the other of the two photo-sensors is detected and is determined as a point in time at which the reflected slit light passes the cell. Accordingly, even if the amount of the slit light reflected from the subject for measurement and projected to the imaging plane and the spatial extent of the slit light in its widthwise direction are varied by a condition or a direction of the surface of the subject for measurement, the point in time at which the reflected slit light moves from one to the other of the two photo-sensors of each cell is influenced little by such variation, and consequently the point in time at which the reflected slit light passes each cell can be detected accurately. Further, even if the temperature of the photo-sensors rises as a result of measurement for a long period of time, since the two photo-sensors of each cell exhibit an equal temperature rise and accordingly dark currents of them exhibit an equal variation, any temperature variation does not have an influence upon a result of comparison in magnitude between photo-electric currents outputted from the two photo-sensors of each cell. Accordingly, there is no necessity of temperature compensation. Further, since the amounts of light received by each two adjacent photo-sensors are considered to be equal to each other, even if light is integrated and read out, it is not influenced by any bias light. Consequently, the sensitivity is improved, and it is possible to make a measurement for an object at a long distance or an object having a low reflection factor.

The comparator may include first and second invertors each having an input terminal connected to an output terminal of the other invertor, a first switch connected between an output terminal of a first one of the photo-sensors and a junction between the input terminal of the first invertor and the output terminal of the second invertor, a second switch connected between an output terminal of a second one of the photo-sensors and a junction between the output terminal of the first invertor and the input terminal of the second invertor, and a third switch connected between the input terminal and the output terminal of the first invertor, and the distance measuring apparatus may further comprise control means for putting, in a first phase, the first, second and third switches into a short-circuited condition to reset the outputs of the photo-sensors and the outputs of the first and second invertors to an intermediate potential, for putting, in a second phase, the third switch into a short-circuited condition to place the outputs of the first and second invertors to an intermediate potential to cause the photo-sensors to discharge and for putting, in a third phase, the first and third switches into a short-circuited condition.

In the distance measuring apparatus, first the first, second and third switches are put into a short-circuited condition so that the outputs of the two photo-sensors of each cell and the outputs of the first and second invertors are reset to an intermediate potential, and then only the third switch is kept in the short-circuited condition so that the two photo-sensors are discharged while the outputs of the first and second invertors remain at the intermediate potential, whereafter the first and second switches are put into a short-circuited condition so that the outputs on which the magnitudes of the outputs of the two photo-sensors are reflected are obtained from the outputs of the first and second invertors. Accordingly, a point in time at which the reflected slit light moves from one to the other of the two photo-sensors can be determined with a simple construction.

Alternatively, each of the cells may further include a pair of amplifiers for amplifying the outputs of the respective corresponding photo-sensors, a first one of the amplifiers including a first invertor for reversing the output of a first one of the photo-sensors and a first switch connected between an input terminal and an output terminal of the first invertor, a second one of the amplifiers including a second invertor for reversing the output of a second one of the photo-sensors and a second switch connected between an input terminal and an output terminal of the second invertor, the comparator including third and fourth invertors each having an input terminal connected to an output terminal of the other invertor, a third switch connected between an output terminal of the first invertor and a junction between the input terminal of the third invertor and the output terminal of the fourth invertor, a fourth switch connected between an output terminal of the second invertor and a junction between the output terminal of the third invertor and the input terminal of the fourth invertor, and a fifth switch connected between the input terminal and the output terminal of the third invertor, and the distance measuring apparatus may further comprise control means for putting, in a first phase, the first and second switches into a short-circuited condition to reset the outputs of the first and second invertors to an intermediate potential, for causing, in a second phase, the photo-sensors to discharge, for putting, in a third phase, the fifth switch into a short-circuited condition to place the outputs of the third and fourth invertors to an intermediate potential and for putting, in a fourth phase, the third and fourth switches into a short-circuited condition.

In the distance measuring apparatus, the first and second switches are put into a short-circuited condition so that the outputs of the first and second invertors are reset to an intermediate potential, and then the two photo-sensors of each cell are discharged, whereafter the fifth switch is put into a short-circuited condition so that the outputs of the third and fourth invertors are put to an intermediate potential, and finally the third and fourth switches are put into a short-circuited condition so that the outputs on which magnitudes of the outputs of the two photo-sensors are reflected can be obtained from the third and fourth invertors. Accordingly, even when the amount of the reflected slit light is small and the output of each photo-sensor is low, a point in time at which the reflected slit light moves from one to the other of the two photo-sensors can be determined with a simple construction.

According to a further aspect of the present invention, there is provided a distance measuring apparatus, which comprises means for emitting slit light to a subject for measurement and scanning the slit light in a lateral direction along a surface of the subject for measurement, means for receiving the slit light reflected from the subject for measurement on an imaging plane, the receiving means including N photo-sensors disposed side by side along the direction of movement of the reflected slit light and defining the imaging plane, N being an integer equal to or greater than 3, first comparison means for comparing magnitudes of photoelectric currents outputted from i−1th and ith ones of the N photo-sensors, i being an integer equal to or greater than 2, and second comparison means for comparing magnitudes of photoelectric currents outputted from ith and i+1th ones of the N photo-sensors, means for detecting points of time at which outputs of the first and second comparators for the ith photo-sensor exhibit a reversal of the relationship in magnitude between the output photoelectric currents of the i−1th and ith photo-sensors and the ith and i+1th photo-sensors, respectively, a memory for storing therein a point of time determined from the points of time detected for the ith photo-sensor by the detecting means as a point in time at which the reflected slit light passes a point of the imaging plane corresponding to the ith photo-sensor, and means for measuring the position of the surface of the subject for measurement based on the points in time stored in the memory.

In the distance measuring apparatus, the first comparison means compares magnitudes of photoelectric currents outputted from the i−1th and ith photo-sensors among the N photo-sensors, and the second comparison means compares magnitudes of photoelectric currents outputted from the ith and i+1th photo-sensors. Then, based on results of the comparison of the first and second comparison means, a point in time at which the reflected slit light moves from the i−1th photo-sensor to the ith photo-sensor is determined and another point in time at which the reflected slit light moves from the ith photo-sensor to the i+1th photo-sensor is determined, and the points in time thus determined are determined as points in time at which the reflected slit light passes corresponding points constituting the imaging plane. Accordingly, a point in time at which the reflected slit light passes each point constituting the imaging plane can be detected accurately while maintaining a high resolution along the direction of movement of the reflected slit light.

According to a still further aspect of the present invention, there is provided a distance measuring apparatus, which comprises means for emitting slit light to a subject for measurement and scanning the slit light in a lateral direction along a surface of the subject for measurement, means for receiving the slit light reflected from the subject for measurement on an imaging plane, the receiving means including a plurality of photo-sensors disposed side by side along the direction of movement of the reflected slit light and defining the imaging plane, a comparison means provided for each pair of ones of the photo-sensors, timing means for allowing, at a first timing, each of the comparison means to compare magnitudes of photoelectric currents outputted from the corresponding pair of photo-sensors and for allowing, at a second timing, each of the comparison means to compare magnitudes of photoelectric currents outputted from a second one of the corresponding pair of photo-sensors and a first one of a next adjacent pair of ones of the sensors, means for detecting points in time at which outputs of the comparison means for each pair of ones of the photo-sensors exhibit a reversal of the relationship in magnitude between the output photoelectric currents of the first and second photo-sensors of the corresponding pair and between the output photoelectric currents of the second photo-sensor of the corresponding pair of photo-sensors and the first photo-sensor of the adjacent next pair of photo-sensors at the first and second timings, respectively, a memory for storing therein the points in time detected by the detecting means as points in time at which the reflected slit light passes two successive points of the imaging plane corresponding to the first and second photo-sensors of the corresponding pair, and means for measuring the position of the surface of the subject for measurement based on the points in time stored in the memory.

In the distance measuring apparatus, the comparing compares, first at a first timing, magnitudes of photoelectric currents outputted from the first photo-sensor pair including two adjacent photo-sensors with each other and then compares, at a second timing, magnitudes of photoelectric currents outputted from the second photo-sensor pair including two adjacent photo-sensors which is at a position displaced by one photo-sensor distance from the first photo-sensor pair with each other. Based on results of the two times of comparison of the comparison means, a point in time when the reflected slit light moves from one to the other of the photo-sensors of the first photo-sensor pair and another point in time when the reflected slit light moves from one to the other of the photo-sensors of the second photo-sensor pair is determined. The points in time thus determined are determined as points in time at which the reflected slit light passes corresponding points constituting the imaging plane. Accordingly, a point in time at which the reflected slit light passes each point constituting the imaging plane can be detected accurately while maintaining a high resolution along the direction of movement of the reflected slit light.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 8 is a block diagram showing a cell of another form wherein a pair of photo-sensors are connected directly to a comparator without using amplifiers;

FIG. 9 is a time chart illustrating control signals supplied to the comparator shown in FIG. 8;

FIG. 10 is a block diagram of an imaging plane of a further form of a further distance measuring apparatus showing a third preferred embodiment of the present invention;

DETAILED DESCRIPTION OF THE PREFERRED EMBODIMENTS

Figure 1:
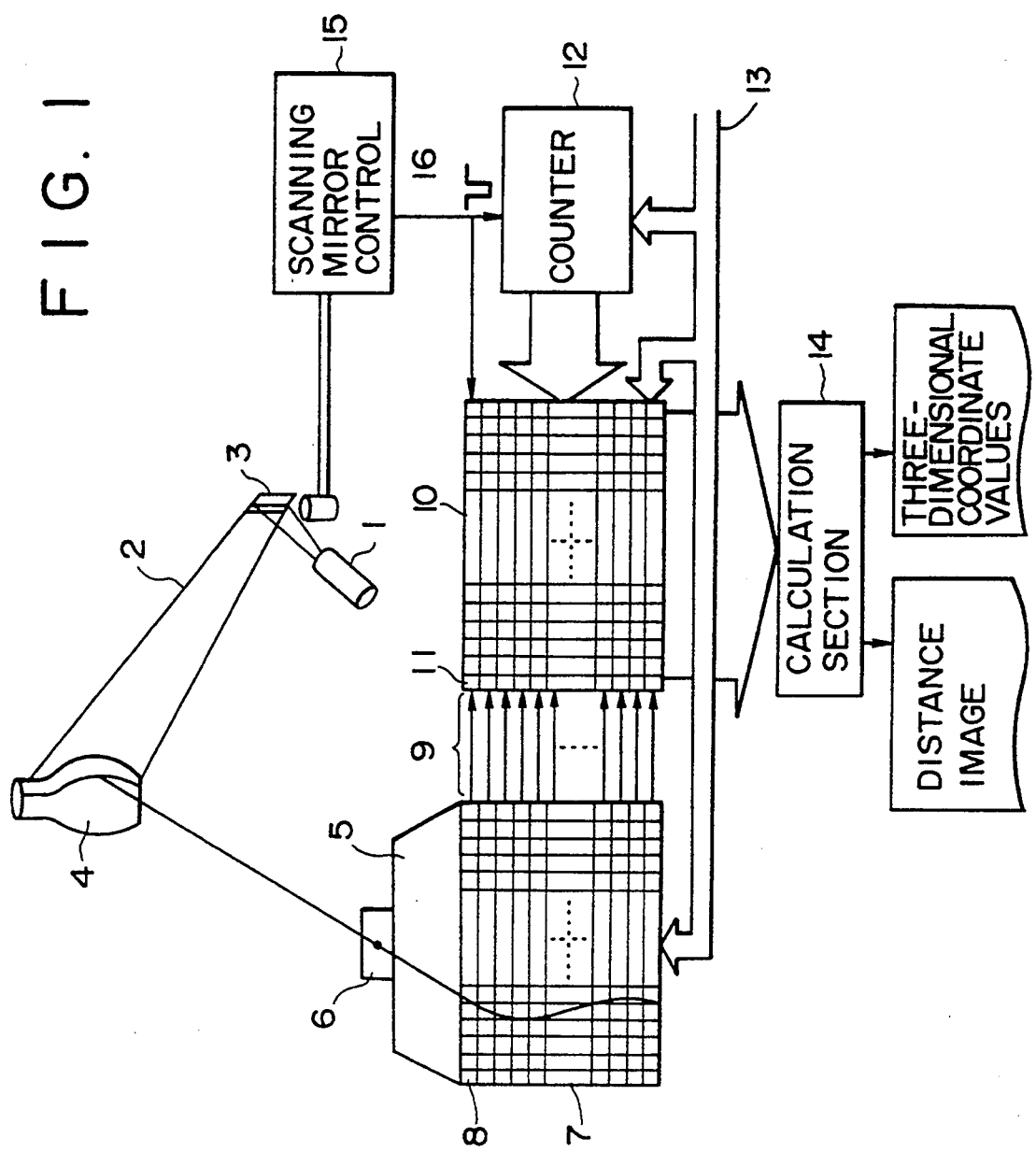
FIG. 1 is a block diagram of a distance measuring apparatus showing a preferred embodiment of the present invention.

Referring first to FIG. 1, there is shown a distance measuring apparatus to which the present invention is applied. Slit light 2 emitted from a slit light emitting laser 1 is scanned on a subject 4 for measurement, which is a three-dimensional object, by a scanning mirror 3 which may be, for example, a galvano mirror. The slit light emitting laser 1 may be, for example, a semiconductor laser of the wavelength of 670 nm which emits slit light of 1 mm wide having the power of 10 mW at the exit of a lens not shown of the slit light emitting laser 1. Slit light reflected from the subject 4 for measurement is continuously projected to an imaging plane 7 through a lens 6 of an imaging apparatus 5. The imaging plane 7 is formed from a plurality of imaging cells 8 disposed in a matrix. Each of the cells 8 outputs a signal when slit 2 passes the subject 4 for measurement in a sight line direction, that is, when the slit light reflected from the subject 4 for measurement passes the cell 8.

The output signal of each cell 8 is read out by a read circuit 9, and a count value of a counter 12 is stored into a memory cell 11 of a count value storage memory 10 corresponding to the cell 8 which has outputted the signal. The counting of the counter 12, the outputting of a signal from each cell 8, and the storing of a count value into a memory cell 11 are performed in synchronism with an operation clock signal 13 of the frequency of, for example, 100 kHz or so supplied from the outside.

Since the scanning mirror 3 rotates at a fixed angular velocity, the output of the counter 12 corresponds to angular position information of the mirror 3. The count values stored in the memory cells 11 are converted into distance information by a calculation section 14. The calculation section 14 either outputs a distance image on video information or outputs three-dimensional coordinate values of the subject 4 for measurement being measured by the cells 8.

A scanning mirror control apparatus 15 outputs a reset signal of the frequency of, for example, 60 Hz or so each time the scanning mirror 3 makes a cycle of scanning operation, and the counter 12 and the counter value storage memory 10 are reset in response to the reset signal.

Figure 2:
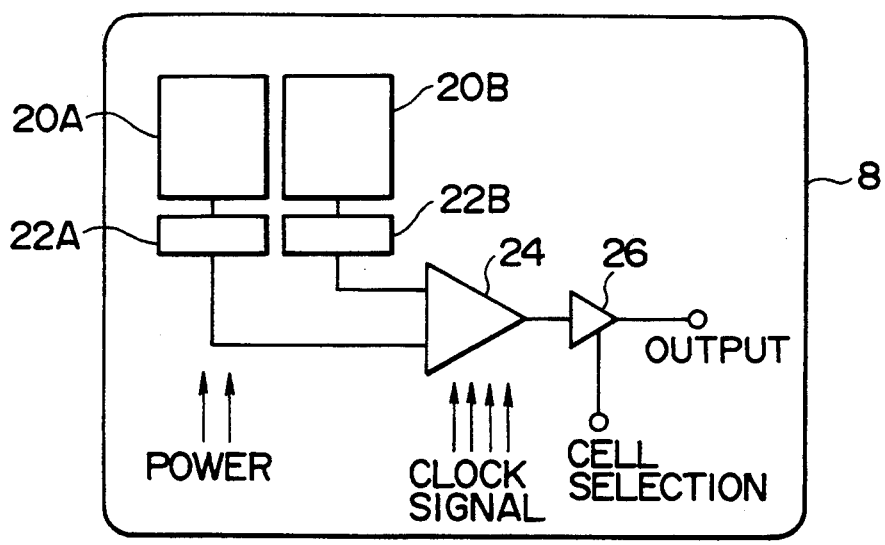
FIG. 2 is a block diagram showing general construction of a cell constituting an imaging plane of the distance measuring apparatus of FIG. 1.

FIG. 2 schematically shows an exemplary construction of an imaging cell 8 employed in the distance measuring apparatus of FIG. 1. Here, it is assumed that the slit light projected to the subject 4 for measurement is scanned in a horizontal direction while the slit for the slit light extends in a vertical direction. Referring to FIG. 2, the imaging cell 8 shown includes a left photo-sensor 20A and a right photo-sensor 20B disposed in a mutually neighboring relationship to each other in the direction of the movement of the slit light. The left photo-sensor 20A is disposed on the left side along the horizontal direction while the right photo-sensor 20B is disposed on the right side along the horizontal direction. In particular, the left photo-sensor 20A is disposed at a position at which it receives the slit light first while the right photo-sensor 20B is disposed at another position at which it receives the slit light later.

A pair of amplifiers 22A and 22B are provided on the output sides of the left and right sensors 20A and 20B, respectively. The amplifiers 22A and 22B amplify the outputs of the left and right sensors 20A and 20B, respectively. The reason why the two amplifiers 22A and 22B are provided is that it is intended to allow detection of slit light even when the amount of the slit light is small.

A comparator 24 compares the outputs of the amplifiers 22A and 22B, and when the former is higher than the latter, the comparator 24 outputs a signal of a first state, for example, of a low level "L". Conversely, when the latter is higher than the former, the comparator 24 outputs another signal of a second state, for example, of a high level "H". A gate 26 outputs the output of the comparator 24 to the outside of the cell 8 when it receives a cell selection signal.

Figure 3:
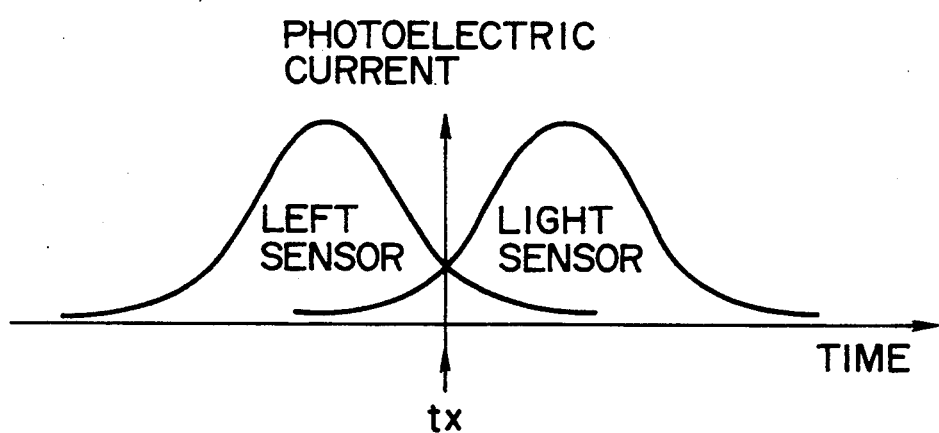
FIG. 3 is a graph illustrating variation with respect to time of photoelectric currents of a left sensor and a right sensor of the distance measuring apparatus of FIG. 1 when reflected slit light moves.

FIG. 3 illustrates the variation of photoelectric currents of the left and right photo-sensors 20A and 20B when the slit light having an extent (dispersion) in the widthwise direction of the slit passes from the left to the right in the horizontal direction. As seen from FIG. 3, first the photoelectric current of the left sensor 20A increases and then decreases, and then the photoelectric current of the right sensor 20B increases and then decreases. Accordingly, the comparator 24 first outputs a signal of the first state, for example, of the "L" level, and then outputs another signal of the second state, for example, of the "H" level.

The instant of transition from the first state to the second state of the output signal of the comparator 24, that is, the instant at which the photoelectric current of the light sensor 20B becomes higher than the photoelectric current of the left sensor 20A, the point of time indicated by an arrow mark in FIG. 3, is stored into a corresponding memory cell 11 in the count value storage memory 8 of FIG. 1 as a point of time tx at which slit light passes the cell. As described hereinabove, information indicating the point of time tx is obtained from the counter 12. The angular position of the mirror 3 shown in FIG. 1, by which the slit light is scanned, can be determined from the point of time tx, and the distance to the subject 4 for measurement can be measured based on triangulation using the angular position of the mirror 3.

Figure 4:
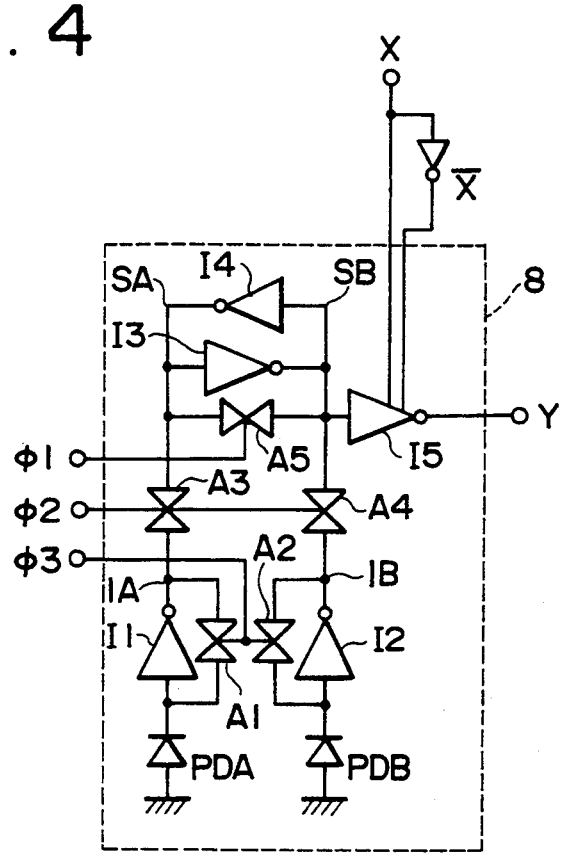
FIG. 4 is a block diagram showing a pair of amplifiers and a comparator of the cell shown in FIG. 2.

FIG. 4 shows a more detailed construction of the cell 8 shown in FIG. 2. Referring to FIGS. 2 and 4, the left and right sensors 20A and 20B are constituted from photodiodes PDA and PDB, respectively: each of the amplifiers 22A and 22B is constituted from a clock type amplifier including a CMOS invertor and an analog switch for short-circuiting an input and an output of the CMOS invertor: and the comparator 24 is constituted from clock type comparators including a pair of CMOS invertors coupled in a positive feed-back relationship and an analog switch for balancing the CMOS invertors to a potential intermediate and low-level "L" and the high level "H".

In particular, the amplifier 22A includes an invertor I1 for reversing the output, that is, the potential at the cathode, of the photodiode PDA, and an analog switch A1 connected between the input terminal and the output terminal of the invertor I1. Meanwhile, the other amplifier 22B includes an invertor I2 for reversing the output, that is, the potential at the cathode, of the photodiode PDB, and an analog switch A2 connected between the input terminal and the output terminal of the invertor I2. The anodes of the photodiodes PDA and PDB are grounded. The analog switches A1 and A2 are controlled by a clock signal, that is, a control signal $\phi 3$.

The comparator 24 includes a pair of invertors I3 and I4 each having an output terminal connected to an input terminal of the other invertor I4 or I3, an analog switch A3 connected between the output terminal of the invertor I1 and a junction between the input terminal of the invertor I3 and the output terminal of the invertor I4, another analog switch A4 connected between the output terminal of the invertor I2 and a junction between the output terminal of the invertor I3 and the input terminal of the invertor I4, and a further analog switch A5 connected between the input terminal and the output terminal of the invertor I3, that is, between the input terminal and the output terminal of the invertor I4. The analog switches A3 and A4 are controlled by a clock signal, that is, another control signal $\phi 2$. The analog switch A5 is controlled by a further clock signal, that is, a control signal $\phi 1$.

Figure 5A:
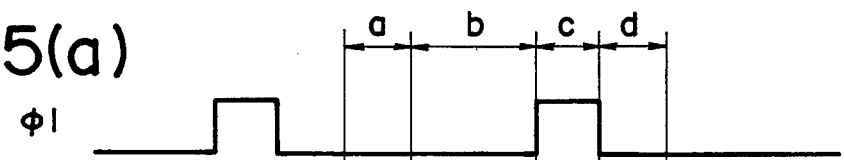
FIG. 5 is a time chart showing control signals supplied to the amplifiers and the comparator shown in FIG. 4.
Figure 5B:
Figure 5C:

FIG. 5 illustrates the variation of the control signals $\phi 1$, $\phi 2$ and $\phi 3$ with respect to time. In a phase a shown in FIG. 5, the control signal $\phi 3$ exhibits the "H" level, and consequently, the analog switches A1 and A2 are in a short-circuited condition so that the outputs of the invertors I1 and I2, that is, the potentials at points 1A and 2B in FIG. 4, are reset to intermediate potentials.

In a next phase b, the control signals $\phi 1$, $\phi 2$ and $\phi 3$ all exhibit the "L" level, and consequently, charge stored in the internal capacitors of the photodiodes PDA and PDB is discharged in response to intensities of light incident to the photodiodes PDA and PDB, respectively.

In a further phase c, the control signal $\phi 1$ exhibits the "H" level, and consequently, the analog switch A5 is in a short-circuited condition so that the potential at the output of the invertor I4, that is, the point SA in FIG. 4, and the potential at the output of the invertor I3, that is, the point SB in FIG. 4, are balanced to intermediate potentials. In the meantime, discharge of the photodiodes PDA and PDB proceeds continuously.

In a final phase d, the control signal $\phi 2$ exhibits the "H" level, and consequently, the analog switches A3 and A4 are in a short-circuited condition. Since the potentials at the points SA and SB which exhibit an intermediate potential in the phase c tend to be stabilized into a condition wherein the point SA is at the "H" level and the point SB is at the "L" level or another condition wherein the point SA is at the "L" level and the point SB is at the "H" level, if the analog switches A3 and A4 are put into a short-circuited condition so that the point SA is connected directly to the point 1A and the point SB is connected directly to the point 1B, then the intensities of light irradiated upon the photodiodes PDA and PDB are reflected on the potentials at the points 1A and 1B, and consequently, one of the points SA and SB which exhibits a lower potential is put into the "L" level state while the other is put into the "H" level state. The potentials at the points SA and SB are stabilized in this condition.

Referring back to FIG. 4, the potential at the point SB is reversed by an invertor I5 and outputted as a digital value Y to the outside of the cell 8 when a cell selection signal X of the "H" level is supplied to the invertor I5 which corresponds to the gate 26 of FIG. 2, that is, at the end of the phase b. On the outside, the digital value Y is monitored so that a point in time at which the level thereof changes over from the "H" level to the "L" level, that is, the level at the point SB changes from the "L" level to the "H" level, is determined. The point of time thus determined is determined as a "point in time at which the slit light passes the cell".

It is to be noted that, when the slit light is not irradiated upon the object the cell is surveying, bias light is irradiated upon both of the left and right sensors 20A and 20B, and in this instance, because of small noise from the outside or a difference in characteristic between photodiodes, it cannot be determined to which side of the "H" level and the "L" level the potential at the point SB falls down. Therefore, when light is introduced by an equal amount to both of the photodiodes PDA and PDB, a same condition as the condition wherein light is irradiated by a greater amount upon the photodiode PDA, that is, a condition wherein the point SB is at the "L" level, must necessarily be established by adopting such a countermeasure as to make the photodiode PDA a little larger than the photodiode PDB or to insert a very high resistor between the point IA and the grounding point so that very small current may flow between them.

Figure 6:
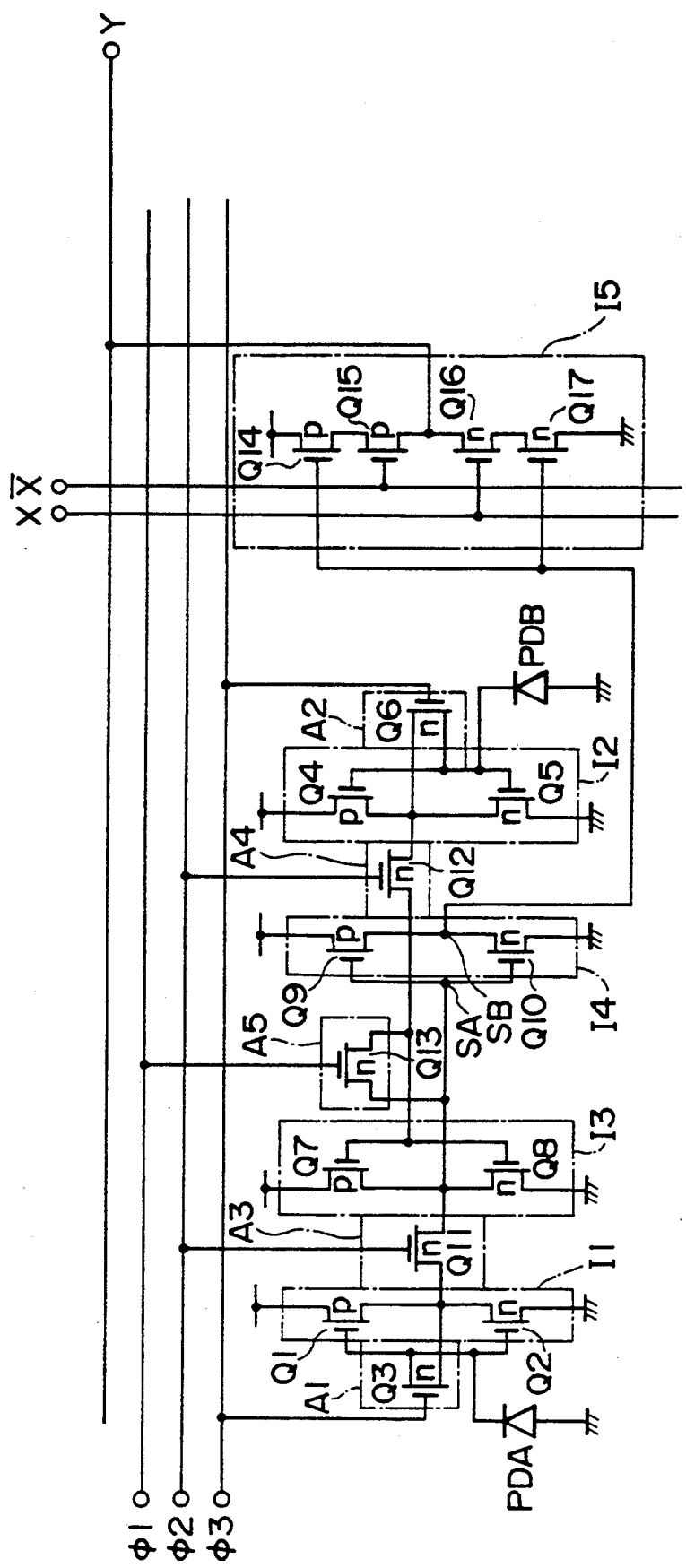
FIG. 6 is a circuit diagram showing detailed construction of the amplifiers and the comparator shown in FIG. 4 which are constructed from MOS-FETs.

FIG. 6 shows an exemplary construction of the cell 8 of FIG. 4 when it is constituted from MOS-FETs. Referring to FIG. 6, the invertor I1 of FIG. 4 includes a PMOS-FET Q1 of which the gate is connected to the cathode of the photodiode PDA and the source is connected to a bias power source, and an NMOS-FET Q2 of which the gate is connected to the cathode of the photodiode PDA, the drain is connected to the drain of the PMOS-FET Q1 and the source is grounded. The switch A1 of FIG. 4 is constituted from an NMOS-FET Q3 of which the drain is connected to the gate of the PMOS-FET Q1 and the gate of the NMOS-FET Q2 and the source is connected to the drain of the PMOS-FET Q1 and to the gate of which the control signal $\phi 3$ is supplied.

The invertor I2 of FIG. 4 includes a PMOS-FET Q4 of which the gate is connected to the cathode of the photodiode PDB and the source is connected to the bias power source, and an NMOS-FET Q5 of which the gate is connected to the cathode of the photodiode PDB, the drain is connected to the drain of the PMOS-FET Q4 and the source is grounded. The switch A2 of FIG. 4 includes an NMOS-FET Q6 of which the drain is connected to the gate of the PMOS-FET Q4 and the gate of the NMOS-FET Q5 and the source is connected to the PMOS-FET Q4 and to the gate of which the control signal $\phi 3$ is supplied.

The invertor I3 of FIG. 4 includes a PMOS-FET Q7 the source of which is connected to the bias power source, and an NMOS-FET Q8 of which the drain is connected to the drain of the PMOS-FET Q7 and the source is grounded. The invertor I4 of FIG. 4 includes a PMOS-FET Q9 of which the source is connected to the bias power source and the gate is connected to the drain of the PMOS-FET Q7 of the invertor I3, and an NMOS-FET Q10 of which the drain is connected to the drain of the PMOS-FET Q9, the gate is connected to the drain of the PMOS-FET Q7 of the invertor I3 and the source is grounded.

The switch A3 of FIG. 4 includes an NMOS-FET Q11 of which the source is connected to the drain of the PMOS-FET Q1 of the invertor I1 and the drain is connected to the drain of the PMOS-FET Q7 of the invertor I3 and to the gate of which the control signal $\phi2$ is supplied. The switch A4 of FIG. 4 includes an NMOS-FET Q12 of which the source is connected to the drain of the PMOS-FET Q9 of the invertor I4 and the drain is connected to the drain of the PMOS-FET Q4 of the invertor I2 and to the gate of which the control signal $\phi2$ is supplied.

The switch A5 of FIG. 4 includes an NMOS-FET Q13 of which the source is connected to the drain of the PMOS-FET Q7 of the invertor I3 and the drain is connected to the drain of the PMOS-FET Q9 of the invertor I4 and to the gate of which the control signal $\phi1$ is supplied.

The invertor I5 of FIG. 4 includes a PMOS-FET Q14 of which the source is connected to the bias power source and the Kate is connected to the drain of the PMOS-FET Q9 of the invertor I4, that is, to the point SB, another PMOS-FET Q15 the source of which is connected to the drain of the PMOS-FET Q14 and to the gate of which a reversed signal of the cell selection signal X is supplied, an NMOS-FET Q16 the drain of which is connected to the drain of the PMOS-FET Q15 and to the gate of which the cell selection signal X is supplied, and another NMOS-FET Q17 of which the drain is connected to the source of the NMOS-FET Q16, the gate is connected to the drain of the PMOS-FET Q9 of the invertor I4, that is, to the point SB, and the source is grounded. When the cell selection signal X is at the "H" level, a digital value Y which is a reversed signal of the potential at the point SB is outputted from a junction between the drain of the PMOS-FET Q15 and the drain of the NMOS-FET Q16.

Figure 7:
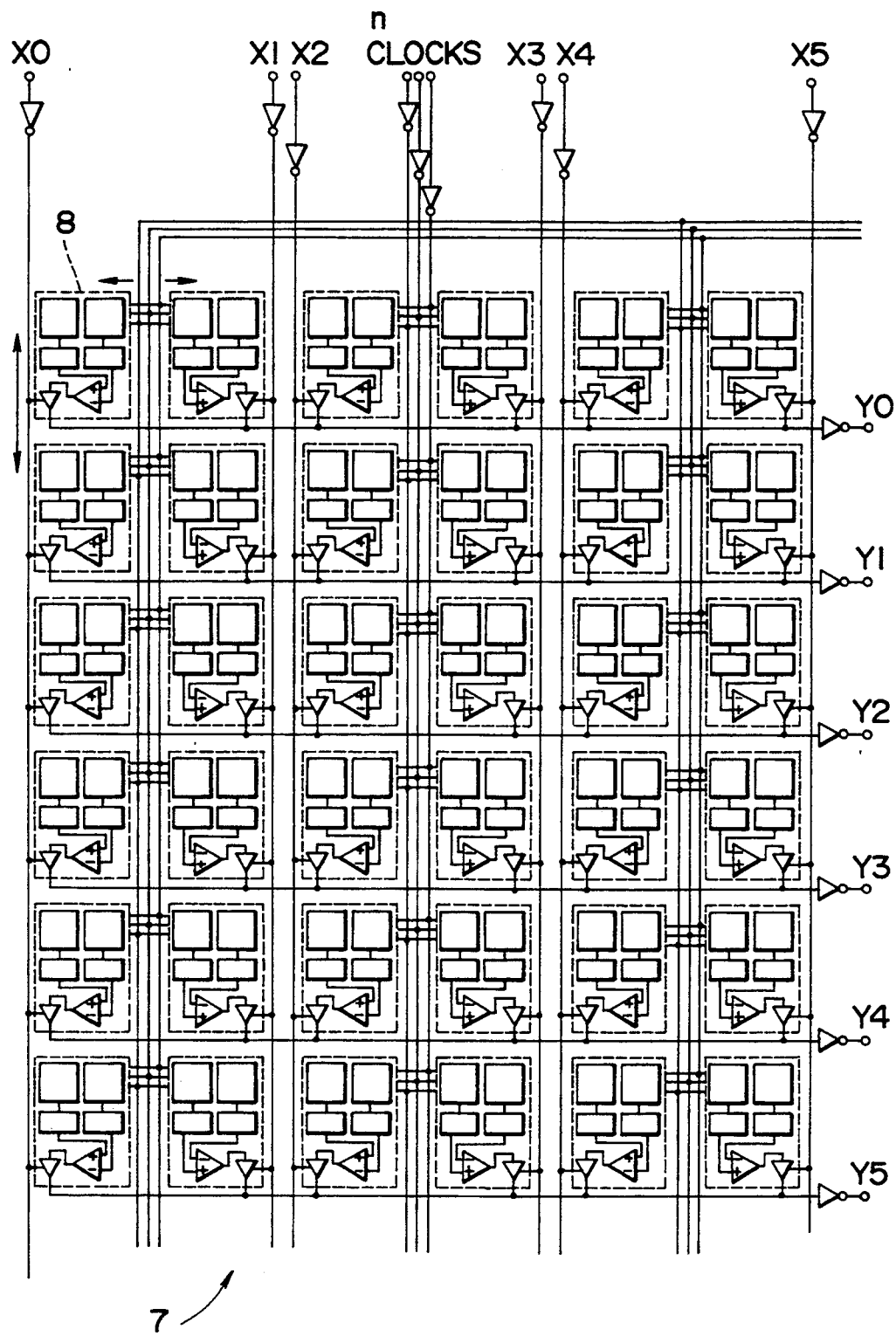
FIG. 7 is a block diagram of an imaging plane of another form constituted from the cells of FIG. 2 showing a second preferred embodiment of the present invention.

FIG. 7 shows an exemplary LSI of the imaging plane 7 wherein such cells 8 of FIG. 2 which can be constructed using NMOS-FETs as shown in FIG. 6 are disposed in a matrix of n rows and m columns. In the LSI shown, a common selection signal is supplied to cells of each column. For example, a common selection signal X0 is supplied to cells of the 0th column. Meanwhile, outputs are common to each row. For example, the outputs of cells of the 0th row are outputted commonly as Y0.

FIG. 8 shows a modification to the cell 8 shown in FIG. 2 in that the amplifiers 22A and 22B are removed from the cell 8 of FIG. 2. In the modified cell, the comparator 24 includes a pair of invertors I11 and I12 each having an output terminal connected to an input terminal of the other invertor I12 or I11, an analog switch A11 connected between the cathode of the photodiode PDA as an output terminal, that is, a point PA, and another point SA which is a junction between the input terminal of the invertor I11 and the output terminal of the invertor I12, another analog switch A12 connected between the cathode of the photodiode PDB as an output terminal, that is, a point PB, and another point SB which is a junction between the output terminal of the invertor I11 and the input terminal of the invertor I12, and a further analog switch A13 connected between the input terminal and the output terminal of the invertor I11, that is, between the input terminal and the output terminal of the invertor I12. A clock signal, that is, a control signal $\phi2$, is supplied to the analog switches A11 and A12, and another clock signal, that is, another control signal $\phi1$, is supplied to the analog switch A13.

FIG. 9 illustrates the variation of the control signals $\phi1$ and $\phi2$ with respect to time. Referring to FIGS. 8 and 9, in a phase A, the control signals $\phi1$ and $\phi2$ both exhibit the "H" level, and consequently, the switches A11, A12 and A13 are in a short-circuited condition, and the output potentials of the photodiodes PDA and PDB, that is, the potentials at the points PA and PB, and the potentials at the output points SA and SB of the invertors I12 and I13, are reset to an intermediate potential.

In a next phase B, the control signals $\phi1$ and $\phi2$ are at the "H" and "L" levels, respectively, and consequently, only the switch A13 is in a short-circuited condition. Accordingly, the potentials at the output points SA and SB of the invertors I12 and I13 are held at an intermediate potential, and charges stored in the internal capacitors of the photodiodes PDA and PDB is discharged in response to intensities of light irradiated upon the photodiodes PDA and PDB, respectively. It is to be noted that the phase C including the phases A and B is a period in which the points SA and SB are balanced to an intermediate potential.

In a subsequent phase D, the control signals $\phi1$ and $\phi2$ exhibit the "L" and "H" levels, respectively, and consequently, the switches A11 and A12 are in a short-circuited condition. Since the potentials at the points SA and SB which exhibit an intermediate potential in the phase C tend to be stabilized into a condition wherein the point SA is at the "H" level and the point SB is the "L" level or another condition wherein the point SA is at the "L" level and the point SB is at the "H" level, if the analog switches A11 and A12 are put into a short-circuited condition so that the point SA is connected directly to the point PA and the point SB is connected directly to the point PB, then the intensities of light irradiated upon the photodiodes PDA and PDB are reflected on the potentials at the points PA and PB, respectively. Consequently, one of the points SA and SB which exhibits a lower potential is put into the "L" level state while the other is put into the "H" level state. The potentials at the points SA and SB are stabilized in this condition.

Referring back to FIG. 8, the potential at the point SB is reversed by an invertor I5 and outputted as a digital value Y to the outside of the cell when a cell selection signal X of the "H" level is supplied to the invertor I5 which corresponds to the gate of FIG. 2.

The cell having the construction of FIG. 8 is effective when the amount of slit light is sufficient.

Where a cell is constituted using a pair of photo-sensors as in the embodiment of FIG. 2, comparing with an alternative arrangement wherein only one photo-sensor is used for one cell as in a conventional apparatus, if a same number of photo-sensors is used, then the resolution in the direction of movement of reflected slit light, that is, in the horizontal direction, is reduced to one half. A distance measuring apparatus shown in FIG. 10 is constructed such that a point in time at which reflected slit light passes a point constituting an imaging plane can be detected accurately without causing such deterioration of the resolution just described.

Referring to FIG. 10, in the distance measuring apparatus shown, N, N is an integer equal to or greater than 3 photodiodes PD1, PD2, PD3, PD4, PD5, . . . are disposed in an equally spaced relationship along the direction of movement of reflected slit light. N amplifiers AM1, AM2, AM3, AM4, AM5, . . . amplify the outputs of the corresponding photodiodes PD1, PD2, PD3, PD4, PD5, . . . respectively.

The output of the amplifier AM1 is supplied to a first one of a pair of inputs of a comparator H1. A distributor circuit D1 distributes the output of an amplifier AM2 to the other of second input of the comparator H1 and also to a first one of a pair of inputs of another comparator H2. Another distributor circuit D2 distributes the output of a further amplifier AM3 to the other or second input of the comparator H2 and also to a first one of a pair of inputs of a further comparator H3. A further distributor circuit D3 distributes the output of a still further amplifier AM4 to the other or second input of the comparator H3 and also to a first one of a pair of inputs of a still further comparator H4. A still further distributor circuit D4 distributes the output of a yet further amplifier AM5 to the other or second input of the comparator H4 and also to a first one of a pair of inputs of a yet further comparator H5.

Each of the comparators H1, H2, H3, H4, H5, . . . compares the first and second inputs thereof with each other, and when the first input is higher than the second input, the comparator outputs a signal of a first state, for example, of the "L" level. On the other hand, when the second input is higher than the first input, it outputs another signal of a second state, for example, of the "H" level. Each of gates G1, G2, G3, G4, G5, . . . outputs the output of the corresponding comparator H1, H2, H3, H4, H5, . . . to the outside when it receives a cell selection signal.

The comparator H1 after all compares magnitudes of photoelectric currents outputted from the first and second photodiodes PD1 and PD2 with each other, and based on a result of the comparison outputted from the comparator H1, a point in time at which the reflected slit light moves from the first photodiode PD1 to the second photodiode PD2 is determined. The comparator H2 after all compares magnitudes of photoelectric currents outputted from the second and third photodiodes PD2 and PD3 with each other, and based on a result of the comparison outputted from the comparator 2, a point in time at which the reflected slit light moves from the second photodiode PD2 to the third photodiode PD3. Such similarly applies to the comparators H3, H4, H5, . . . .

As a point in time at which the reflected slit light moves from the i-1th (i is an integer equal to or greater than 2) photodiode to the ith photodiode and another point in time at which the reflected slit light moves from the ith photodiode to the i+1th photodiode both calculated in such a manner as described above are determined as points in time at which the reflected slit light passes the two points constituting the imaging plane, a point in time at which reflected light passes any point constituting the imaging plane can be detected accurately. In other words, in the embodiment of FIG. 10, the resolution in the direction of movement of the reflected slit light is improved by comparing photoelectric currents outputted from two photodiodes on the opposite sides of a boundary between each two adjacent ones of the N photodiodes disposed in an equally spaced relationship from each other.

Figure 11:
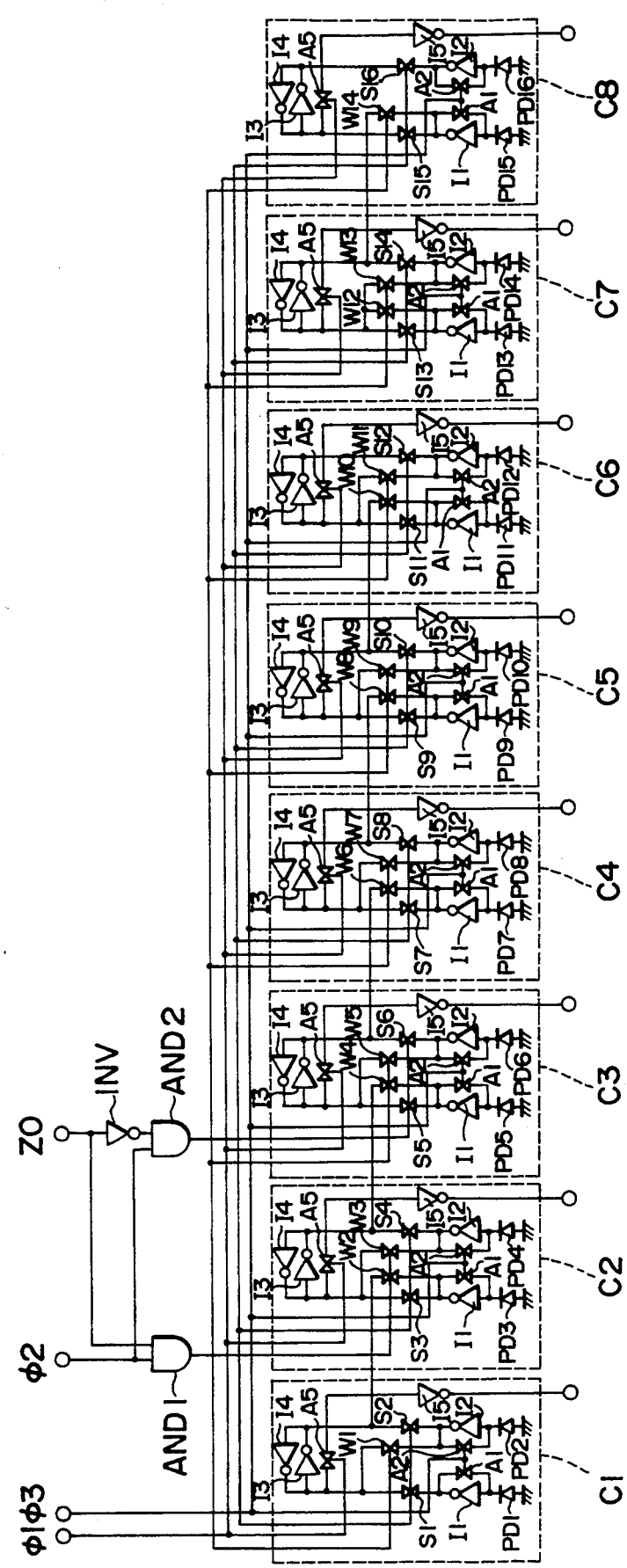
FIG. 11 is a block diagram of a further imaging plane of a still further form of a still further distance measuring apparatus showing a fourth preferred embodiment of the present invention.

In the distance measuring apparatus of FIG. 10, the output of each photodiode is used by two comparators on the opposite sides of the same so that comparison in photoelectric current is performed simultaneously by the two comparators. Such arrangement requires a number of comparators equal to the number of photodiodes. A distance measuring apparatus of FIG. 11 is constructed such that, while only a number of comparators equal to one half the number of photodiodes are required, a point in time at which reflected slit light passes a point constituting an imaging plane can be detected accurately while maintaining a high resolution in the direction of movement of the reflected slit light. In the distance measuring apparatus of FIG. 1, such cell structure as shown in FIG. 4 is employed, and the outputs of two different photodiodes are supplied in a time dividing relationship to a same comparator.

Referring to FIG. 11, a total of 16 photodiodes PD1 to PD16 are disposed in an equally spaced relationship from each other along the direction of movement of light of reflected slit light. Each of portions C1 to C8 each surrounded by a broken line corresponds to the cell of FIG. 4. Paying attention first to the portion C1 surrounded by a broken line, invertors I1, I2, I3, I4 and I5 and analog switches A1, A2 and A5 are similar to those of the cell 8 denoted by like reference characters of FIG. 4. The portion C1 is different from the cell 8 in that it includes a pair of analog switches S1 and S2 in place of the analog switches A1 and A2 of the cell 8, and a further analog switch W1 is provided between the output of the invertor I2 and the input of the invertor I3 while a still further analog switch W2 is provided between the output of the invertor I1 of the portion C2, which corresponds to an adjacent cell, and the input of the invertor I4. The output of an AND gate AND1 is connected to control inputs of the analog switches W1 and W2 while the output of another AND gate AND2 is connected to control inputs of the analog switches S1 and S2. The invertors I3 and I4 and the analog switches A5, S1, S2, W1 and W2 constitute a comparator.

A clock signal same as that in FIG. 4, that is, the control signal $\phi 2$, is supplied to a first one of a pair of inputs of the AND gate AND1 while a timing signal Z0 for changing over a photodiode from which photoelectric current is to be supplied to the comparator is supplied to the other or second input of the AND gate AND1. Another clock signal, that is, the control signal $\phi 2$, is supplied to a first one of a pair of inputs of the AND gate AND2 while the timing signal Z0 is supplied by way of an invertor INV to the other or second input of the AND gate AND2.

Now, paying attention to the portion C2 surrounded by another broken line, invertors I1, I2, I3, I4 and I5 and analog switches A1, A2 and A5 are same as those of the cell 8 of FIG. 4 to which like reference characters are applied. The portion C2 is different from the cell 8 in that it includes a pair of analog switches S3 and S4 in place of the analog switches A1 and A2 of the cell 8 and a further analog switch W3 is provided between the output of the invertor I2 and the input of the invertor I3 while a still further analog switch W4 is provided between the output of the invertor I1 of the portion C3, which corresponds to an adjacent cell, and the input of the invertor I4. The output of an AND gate AND1 is connected to control inputs of the analog switches W3 and W4 while the output of another AND gate AND2 is connected to control inputs of the analog switches S3 and S4. The invertors I3 and I4 and the analog switches A5, S3, S4, W3 and W4 constitute another comparator.

Subsequently, paying attention to the portion C3 surrounded by a further broken line, invertors I1, I2, I3, I4 and I5 and analog switches A1, A2 and A5 are same as those of the cell 8 of FIG. 4 to which like reference characters are applied. The portion C3 is different from the cell 8 in that it includes a pair of analog switches S5 and S6 in place of the analog switches A1 and A2 of the cell 8 and a further analog switch W5 is provided between the output of the invertor I2 and the input of the invertor I3 while a still further analog switch W6 is provided between the output of the invertor I1 of the portion C4, which corresponds to an adjacent cell, and the input of the invertor I4. The output of an AND gate AND1 is connected to control inputs of the analog switches W5 and W6 while the output of another AND gate AND2 is connected to control inputs of the analog switches S4 and S6. The invertors I3 and I4 and the analog switches A5, S5, S5, W6 and W6 constitute a further comparator.

Further, paying attention to the portion C4 surrounded by a still further broken line, inventors I1, I2, I8, I4 and I5 and analog switches A1, A2 and A5 are same as those of the cell 8 of FIG. 4 to which like reference characters are applied. The portion C4 is different from the cell 8 in that it includes a pair of analog switches S7 and S8 in place of the analog switches A1 and A2 of the cell 8 and a further analog switch W7 is provided between the output of the invertor I2 and the input of the invertor I3 while a still further analog switch W8 is provided between the output of the inventor I1 of the portion C5, which corresponds to an adjacent cell, and the input of the invertor I4. The output of an AND gate AND1 is connected to control inputs of the analog switches W7 and W8 while the output of another AND gate AND2 is connected to control inputs of the analog switches S7 and S8. The invertors I3 and I4 and the analog switches A5, S7, S8, W7 and W8 constitute a still further comparator.

Now, paying attention to the portion C5 surrounded by a yet further broken line, inventors I1, I2, I3, I4 and I5 and analog switches A1, A2 and A5 are same as those of the cell 8 of FIG. 4 to which like reference characters are applied. The portion C5 is different from the cell 8 in that it includes a pair of analog switches S9 and S10 in place of the analog switches A1 and A2 of the cell 8 and a further analog switch W9 is provided between the output of the invertor I2 and the input of the invertor I3 while a still further analog switch W10 is provided between the output of the invertor I1 of the portion C6, which corresponds to an adjacent cell, and the input of the invertor I4. The output of an AND gate AND1 is connected to control inputs of the analog switches W9 and W10 while the output of another AND gate AND2 is connected to control inputs of the analog switches S9 and S10. The invertors I3 and I4 and the analog switches A5, S9, S10, W9 and W10 constitute a yet further comparator.

Subsequently, paying attention to the portion C6 surrounded by a yet further broken line, invertors I1, I2, I3, I4 and I5 and analog switches At, A2 and A5 are same as those of the cell 8 of FIG. 4 to which like reference characters are applied. The portion C6 is different from the cell 8 in that it includes a pair of analog switches S11 and S12 in place of the analog switches A1 and A2 of the cell 8 and a further analog switch W11 is provided between the output of the invertor I2 and the input of the invertor I3 while a still further analog switch W12 is provided between the output of the invertor I1 of the portion C7, which corresponds to an adjacent cell, and the input of the invertor I4. The output of an AND gate AND1 is connected to control inputs of the analog switches W11 and W12 while the output of another AND gate AND2 is connected to control inputs of the analog switches S11 and S12. The invertors IS and I4 and the analog switches A5, S11, S12, W11 and W12 constitute a yet further comparator.

Next, paying attention to the portion C7 surrounded by a yet further broken line, invertors I1, I2, I3, I4 and I5 and analog switches A1, A2 and A5 are same as those of the cell 8 of FIG. 4 to which like reference characters are applied. The portion C6 is different from the cell 8 in that it includes a pair of analog switches S13 and S14 in place of the analog switches A1 and A2 of the cell 8 and a further analog switch W13 is provided between the output of the invertor I2 and the input of the invertor I3 while a still further analog switch W14 is provided between the output of the invertor I1 of the portion C8, which corresponds to an adjacent cell, and the input of the invertor I4. The output of an AND gate AND1 is connected to control inputs of the analog switches W13 and W14 while the output of another AND gate AND2 is connected to control inputs of the analog switches S13 and S14. The invertors I3 and I4 and the analog switches A5, S13, S14, W13 and W14 constitute a yet further comparator.

Subsequently, paying attention to the portion C8 surrounded by a yet further broken line, invertors I1, I2, I3, I4 and I5 and analog switches A1, A2 and A5 are same as those of the cell 8 of FIG. 4 to which like reference characters are applied. The portion C6 is different from the cell 8 in that it includes analog switches S15 and S16 in place of the analog switches A1 and A2 of the cell 8. The output of an AND gate AND2 is connected to control inputs of the analog switches S15 and S16. The invertors I3 and I4 and the analog switches AS, S15 and S16 constitute a yet further comparator.

Figure 12:
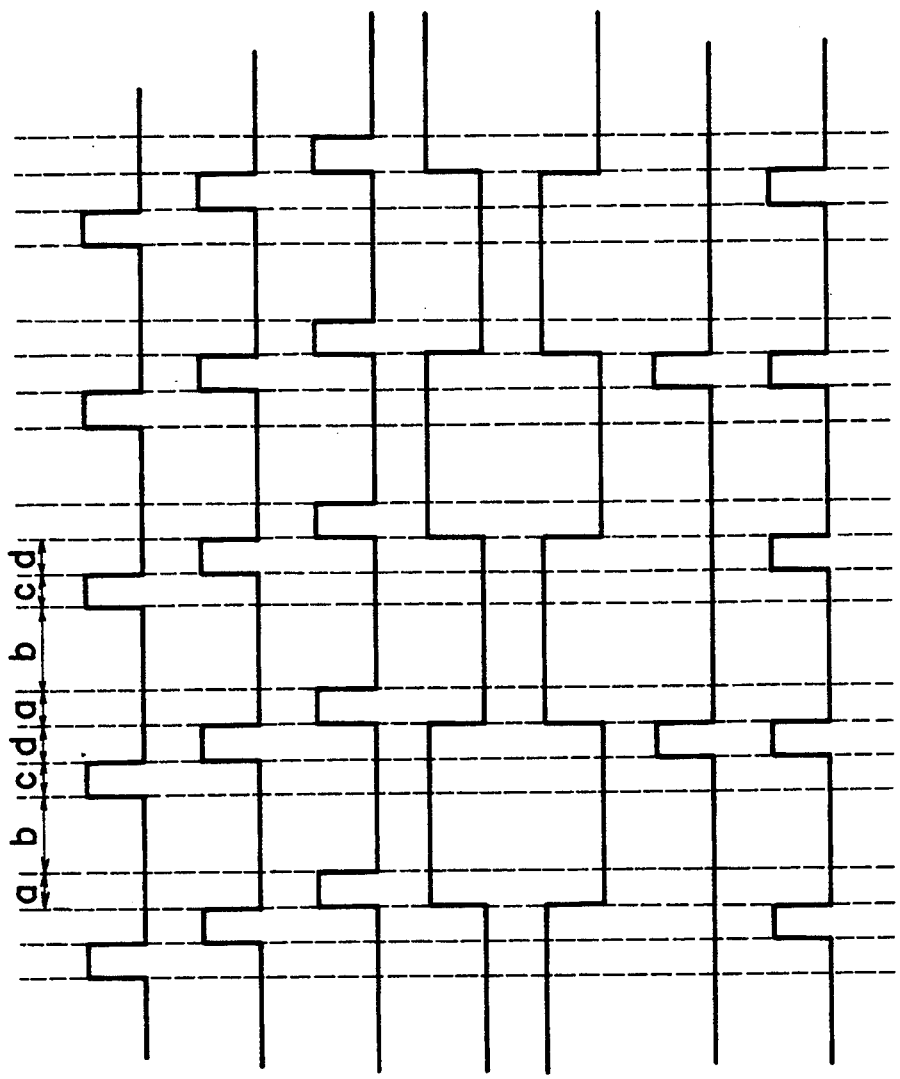
FIG. 12 is a time chart showing signals at several portions of the distance measuring apparatus shown in FIG. 11.
Figure 13:
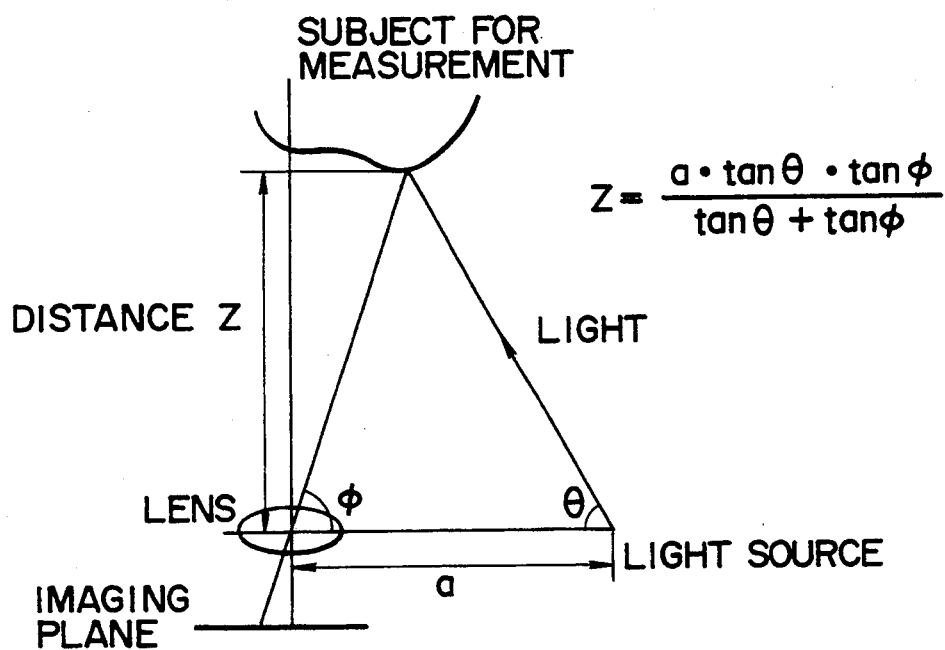
FIG. 13 is a diagrammatic view illustrating a principle of distance measurement based on a light cutting method which makes use of slit light.
Figure 14:
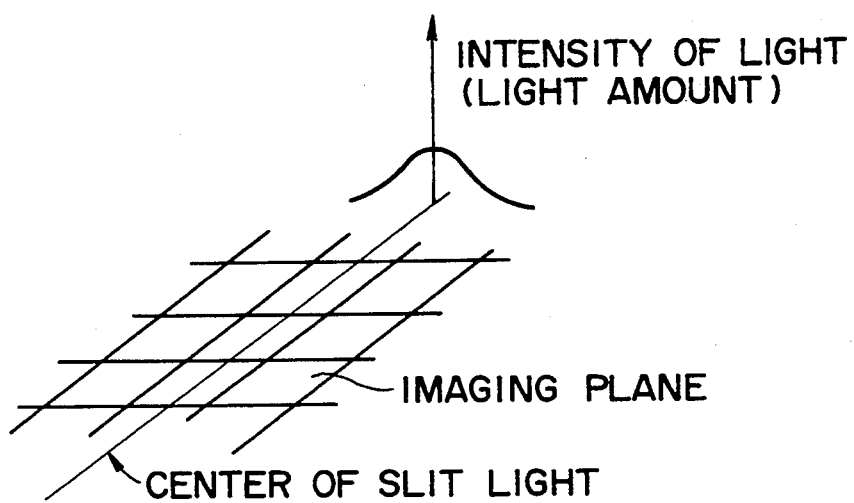
FIG. 14 is a diagrammatic view illustrating a light intensity distribution of slit light.
Figure 15:
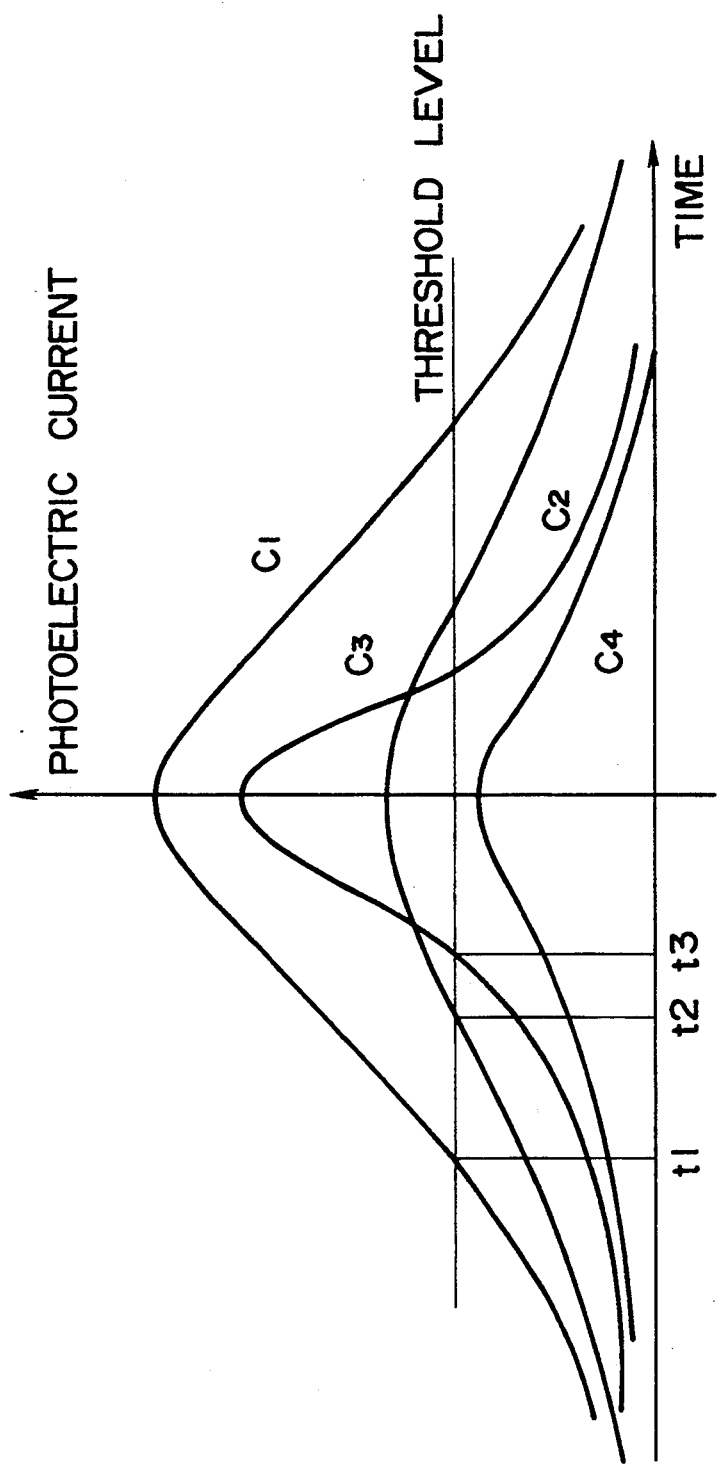
FIG. 15 is a graph illustrating variation of the point in time at which slit light is detected when the amount of the slit light varies.

FIG. 12 illustrates waveforms of signals at several portions of the distance measuring apparatus shown in FIG. 11. Referring also to FIG. 12, when the timing signal Z0 is at the "L" level, if the timing signal $\phi 2$ is supplied, then since the output of the AND gate AND2 is at the "H" level, the analog switches S1 to S16 are all turned on, and photoelectric currents of 8 photodiode pairs (PD1, PD2), (PD3, PD4), (PD5, PD6), (PD7, PD8), (PD9, PD10), (PD11, PD12), (PD13, PD14) and (PD15, PD16) are compared with each other to detect passage of the reflected slit light.

On the contrary when the timing signal Z0 is at the "H" level, if the timing signal $\phi 2$ is supplied, then since the output of the AND gate AND1 is at the "H" level, the analog switches W1 to W14 are on, and consequently, photoelectric currents of 7 photodiode pairs (PD2, PD3), (PD4, PD5), (PD6, PD7), (PD8, PD9), (PD10, PD11), (PD12, PD13) and (PD14, PD15) are compared with each other to detect passage of reflected slit light.

Since slit light is scanned in synchronism with each phase, the pairing relationship of the photodiodes varies alternately. Accordingly, the resolution can be raised by superimposing results of two successive measurements (15 in the case of the arrangement of FIG. 11).

It is to be noted that, while a photodiode is employed as a photo-sensor in the embodiments described above, for example, a phototransistor or a like element can also be employed. In summary, any photo-sensor which outputs a signal in accordance with an intensity of light may be employed.

Having now fully described the invention, it will be apparent to one of ordinary skill in the art that many changes and modifications can be made thereto without departing from the spirit and scope of the invention as set forth herein.

What is claimed is:

1. A distance measuring method, comprising the steps of:

scanning slit light in a direction along a surface of a subject for measurement, and simultaneously receiving slit light reflected from the subject for measurement on an imaging plane comprised of a plurality of cells, each cell including a pair of photo-sensors disposed side by side along the direction of movement of the reflected slit light;

comparing magnitudes of photoelectric currents outputted from one photo-sensor of each of said cells with the other photo-sensor of each cell;

determining, based on a result of the comparison, points in time at which the reflected slit light moves from one to the other of the photo-sensors for each of said cells and determining points in time at which the reflected slit light passes each cell; and detecting a position of the surface of the subject for measurement from the thus determined points in time at which the reflected slit light passes the cells of said imaging plane.

2. A distance measuring apparatus, comprising:

means for emitting slit light to a subject for measurement and scanning the slit light in a lateral direction along a surface of the subject for measurement;

means for receiving slit light reflected from the subject for measurement on an imaging plane, said receiving means including a plurality of cells which define said imaging plane, each of said cells including a pair of photo-sensors disposed side by side along the lateral direction of movement of the reflected slit light and a comparator in each of said cells for comparing magnitudes of photoelectric currents outputted from the pair of said photo-sensors;

means for detecting a point in time at which an output of said comparator for each of said cells exhibits a reversal of a relationship in magnitude between the output photoelectric currents from said pair of photo-sensors for each cell;

a memory for storing therein the point in time detected for each of said cells by said detecting means as a point in time at which the reflected slit light passes the cell; and means for measuring a position of the surface of the subject for measurement based on the points in time stored in said memory.

3. A distance measuring apparatus, comprising:

means for emitting slit light to a subject for measurement and scanning the slit light in a lateral direction along a surface of the subject for measurement;

means for receiving slit light reflected from the subject for measurement on an imaging plane, said receiving means including a plurality of cells which define said imaging plane, each of said cells including a pair of photo-sensors disposed side by side along the lateral direction of movement of the reflected slit light and a comparator in each of said cells for comparing magnitudes of photoelectric currents outputted from the pair of said photo-sensors;

means for detecting a point in time at which an output of said comparator for each of said cells exhibits a reversal of a relationship in magnitude between the output photoelectric currents from said pair of photo-sensors for each cell;

a memory for storing therein the point in time detected for each of said cells by said detecting means as a point in time at which the reflected slit light passes the cell; and means for measuring a position of the surface of the subject for measurement based on the points in time stored in said memory;

wherein said comparator includes first and second invertors each having an input terminal connected to an output terminal of the other invertor, a first switch connected between an output terminal of a first one of said photo-sensors and a junction between the input terminal of said first invertor and the output terminal of said second invertor, a second switch connected between an output terminal of a second one of said photo-sensors and a junction between the output terminal of said first invertor and the input terminal of said second invertor, and a third switch connected between the input terminal and the output terminal of said first invertor, and further comprising control means for putting, in a first phase, said first, second and third switches into a short-circuited condition to reset the outputs of said photo-sensors and the outputs of said first and second invertors to a first intermediate potential between a logical low level and a logical high level, for putting, in a second phase, said third switch into a short-circuited condition to place the outputs of said first and second invertors to a second intermediate potential to cause said photo-sensors to discharge and for putting, in a third phase, said first and third switches into a short-circuited condition.

4. A distance measuring apparatus, comprising:

means for emitting slit light to a subject for measurement and scanning the slit light in a lateral direction along a surface of the subject for measurement;

means for receiving slit light reflected from the subject for measurement on an imaging plane, said receiving means including a plurality of cells which define said imaging plane, each of said cells including a pair of photo-sensors disposed side by side along the lateral direction of movement of the reflected slit light and a comparator in each of said cells for comparing magnitudes of photoelectric currents outputted from the pair of said photo-sensors;

means for detecting a point in time at which an output of said comparator for each of said cells exhibits a reversal of a relationship in magnitude between the output photoelectric currents from said pair of photo-sensors for each cell;

a memory for storing therein the point in time detected for each of said cells by said detecting means as a point in time at which the reflected slit light passes the cell; and means for measuring a position of the surface of the subject for measurement based on the points in time stored in said memory;

wherein each of said cells further includes a pair of amplifiers for amplifying the outputs of the respective pair of photo-sensors, a first one of said amplifiers including a first invertor for reversing the output of a first one of said photo-sensors and a first switch connected between an input terminal and an output terminal of said first invertor, a second one of said amplifiers including a second invertor for reversing the output of a second one of said photo-sensors and a second switch connected between an input terminal and an output terminal of said second invertors said comparator including third and fourth invertors each having an input terminal connected to an output terminal of the other invertor, a third switch connected between an output terminal of said first invertor and a junction between the input terminal of said third invertor and the output terminal of said fourth invertor, a fourth switch connected between an output terminal of said second invertor and a junction between the output terminal of said invertor and the input terminal of said fourth invertor, and a fifth switch connected between the input terminal and the output terminal of said third invertor, said distance measuring apparatus further comprising control means for putting, in a first phase, said first and second switches into a short-circuited condition to reset the outputs of said first and second invertors to a first intermediate potential between a logical low level and a logical high level, for causing, in a second phase, said photo-sensors to discharge, for putting, in a third phase, said fifth switch into a short-circuited condition to place the outputs of said third and fourth invertors to a second intermediate potential and for putting, in a fourth phase, said third and fourth switches into a short-circuited condition.

5. A distance measuring apparatus, comprising:

means for emitting slit light to a subject for measurement and scanning the slit light in a lateral direction along a surface of the subject for measurement;

means for receiving slit light reflected from the subject for measurement on an imaging plane, said receiving means including N photo-sensors disposed side by side along the direction of movement of the reflected slit light and defining said imaging plane, N being an integer equal to or greater than 3, first comparison means for comparing magnitudes of photoelectric currents outputted from $i-1$th and ith ones of said N photo-sensors, i being an integer equal to or greater than 2, and second comparison means for comparing magnitudes of photoelectric currents outputted from ith and $i+1$th ones of said N photo-sensors;

means for detecting points in time at which outputs of said first and second comparison means for the ith photo-sensor exhibit a reversal of a relationship in magnitude between the output photoelectric currents of the $i-1$th and ith photo-sensors for the first comparison means and the ith and the $i+1$th photo-sensors for the second comparison means;

a memory for storing therein a point in time determined from the points in time detected for the ith photo-sensor by said detecting means as a point in time at which the reflected slit light passes a point of said imaging plane corresponding to the ith photo-sensor; and means for measuring position of the surface of the subject for measurement based on the points in time stored in said memory.

6. A distance measuring apparatus, comprising:

means for emitting slit light to a subject for measurement and scanning the slit light in a lateral direction along a surface of the subject for measurement;

means for receiving slit light reflected from the subject for measurement on an imaging plane, said receiving means including a plurality of photo-sensors disposed side by side along the lateral direction of movement of the reflected slit light, said plurality of photo-sensors defining said imaging plane;

comparison means provided for each pair of said photo-sensors;

timing means for allowing, at a first timing, each of the comparison means to compare magnitudes of photoelectric currents outputted from the corresponding pair of photo-sensors and for allowing, at a second timing, each of the comparison means to compare magnitudes of photoelectric currents outputted from a second pair of photo-sensors, said second pair comprising one photo-sensor from the corresponding pair of photo-sensors and a photo-sensor from an adjacent pair of photo-sensors;

means for detecting points in time at which outputs of said comparison means for each pair of said photo-sensors exhibit a reversal of a relationship in magnitude between the output photoelectric currents in said corresponding pair of photo-sensors and between the output photoelectric currents of the one photo-sensor in the corresponding pair of photo-sensors and the photo-sensor from the adjacent pair of photo-sensors at the first and second timings, respectively;

a memory for storing therein the points in time detected by said detecting means as points in time at which the reflected slit light passes two successive points of said imaging plane corresponding to the photo-sensors in the corresponding pair; and means for measuring a position on the surface of the subject for measurement based on the points in time stored in said memory.

* * * * *